Dec. 17, 1929.      H. S. BROADWELL ET AL      1,740,222
FISHING REEL
Filed Feb. 7, 1929
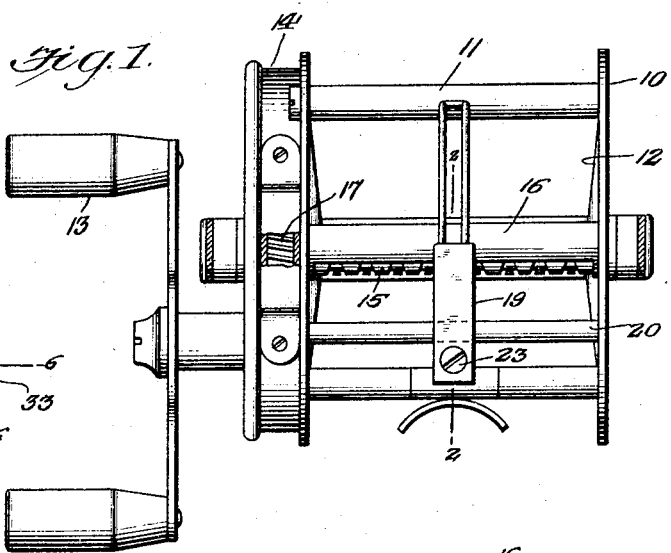
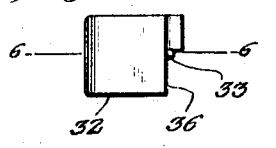
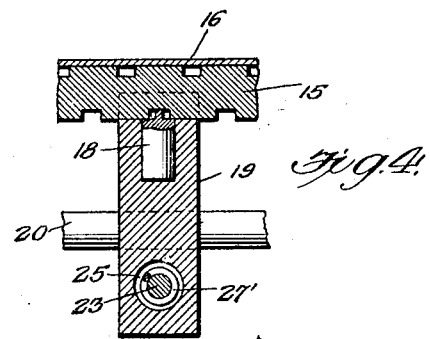
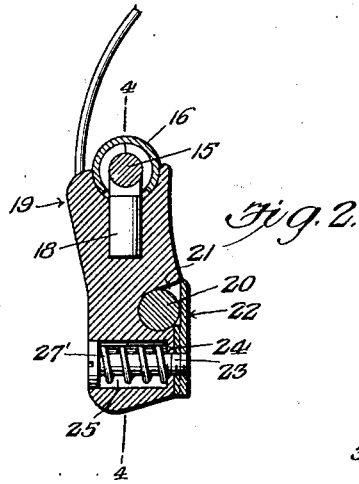
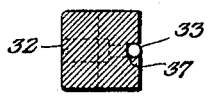
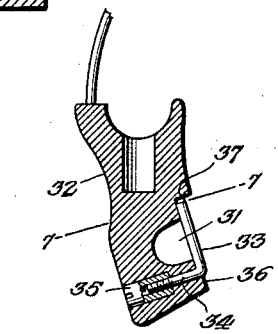
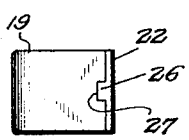
Inventors
H. S. Broadwell and
S. T. Thorpe
By
their Attorneys Patented Dec. 17, 1929

1,740,222

UNITED STATES PATENT OFFICE

HALVOR S. BROADWELL AND SAMUEL T. THORPE, OF BRISTOL, CONNECTICUT, ASSIGNORS TO THE HORTON MANUFACTURING COMPANY, OF BRISTOL, CONNECTICUT, A CORPORATION OF CONNECTICUT

FISHING REEL

Application filed February 7, 1929. Serial No. 338,173.

This invention relates to improvements in fishing reels and particularly to a device or attachment now generally found on reels for the purpose of guiding the fishing line to wind it level on the spool of the reel.

These level winding attachments embody what is called a line guide carriage which, in most cases, can only be removed with considerable difficulty when it is necessary to make repairs to the device. For instance, in numerous structures, it is impossible to remove the carriage without disassembling the reel proper. This is quite a disadvantage, especially when a line is on the reel and in actual use. In view of this, the present invention seeks to provide a level winding attachment wherein the carriage can be removed without, in any way, disturbing any of the parts of the reel proper.

More specifically, the present attachment comprises a carriage slidably mounted on a guide bar, said bar being received in a recess in the carriage and the recess being closed by a swiveled member normally held in position by a screw whereby said member may be released and the carriage demounted by simply loosening said screw.

With these and other objects in view, the invention consists in details of construction and combinations and arrangements of parts, all as will hereinafter be more fully described and the novel features thereof particularly pointed out in the appended claims.

In the accompanying drawings,

Figure 1 is an elevational view of a reel illustrating the preferred form of the attachment;

Fig. 2 is a sectional view on the line 2—2 of Fig. 1;

Fig. 3 is a bottom plan view of the line guide carriage;

Fig. 4 is a section on the line 4—4 of Fig. 3;

Fig. 5 is a bottom plan view of a modified form of carriage;

Fig. 6 is a section on line 6—6 of Fig. 5; and

Fig. 7 is a section on line 7—7 of Fig. 6.

As the level winding attachment is the essence of the invention, the reel proper is shown more or less in outline, as it may be of any desired construction.

In the present instance, it is illustrated as comprising the usual end plates or disks 10 spaced apart by rods 11. The spool 12 is journaled in said end plates and is rotated by handle 13 through suitable gearing enclosed in casing 14 on one of said plates.

Journaled in the end plates near the periphery thereof is the traversing screw shaft 15 partially enclosed by the tubular steadying bar 16. Gear 17, connected to the gearing for rotating spool 12, drives shaft 15 and a pawl 18 in carriage 19 causes the latter to be reciprocated by said shaft back and forth on its guide bar 20. As will be understood, the carriage is slidable on said bar 20, as well as on the steadying bar 16.

In the preferred form of carriage, the guide bar 20 is received in a recess 21 in the bottom of the carriage, being retained therein by a plate 22 swiveled on the carriage body. Said retaining plate is attached to a pin 23, a portion of which is formed with threads that engage an internally threaded cap 24 in a hole 25 in the carriage. By tightening up the screw the plate is secured firmly against the bottom of the carriage. To position said plate properly across recess 21, it is provided with a rib 26 adapted to engage in a groove 27 in the bottom of the carriage. A spring 27' may also be placed in hole 25 against the inner end of screw cap 24 to aid in seating said rib in the groove when in registry with each other.

In the embodiment illustrated in Figs. 5 to 7, the closure for the recess 31 in carriage 32 is adapted to be closed by a pin 33 whose offset shank portion 34 is threaded and engages in the internally threaded cap 35. The bottom face of the carriage is cut away at one side, as at 36, permitting the pin to swing to a position at right angles to the recess, at which point it is in registry with a groove 37 in which it can be seated by taking up on the screw.

In both constructions, the carriage is secured on the guide bar without liability of becoming accidentally displaced, but, by simply loosening the screw and swinging the retaining plate or pin to one side, said carriage can be easily and expeditiously removed. As will be apparent, no portion of the reel proper need be removed.

What is claimed is:

1. In a fishing reel, a frame, a spool, a traversing shaft, a guide bar spaced to one side of said shaft, a line guide carriage slidable on said bar longitudinally of said shaft, said carriage having a recess therein in which said bar is received, a closure for said recess, and a pawl in said carriage engaging said shaft.

2. In a fishing reel, a frame, a spool, a traversing shaft, a guide bar spaced to one side of said shaft, a line guide carriage having a recess therein in which said bar is received, said carriage being slidable on said bar longitudinally of the shaft, a pivoted closure for said recess and a pawl in said carriage engaging said shaft.

3. In a fishing reel, a frame, a spool, a traversing shaft, a guide bar, a line guide carriage comprising a body portion having a recess therein in which said bar is received, a closure for said recess pivoted on said carriage body, and a pawl in said carriage body engaging said shaft.

4. In a fishing reel, a frame, a spool, a traversing shaft, a guide bar, a line guide carriage having a recess therein in which said bar is received, a closure swiveled on said carriage retaining said shaft in said recess, and a pawl in said carriage engaging said shaft.

5. In a fishing reel, a frame, a spool, a traversing shaft, a guide bar, a line guide carriage having a recess therein in which said bar is received, a closure for said recess, a stem carrying said closure and rotatable in said carriage, means for locking said stem against rotation, and a pawl in said carriage engaging said shaft.

HALVOR S. BROADWELL.
SAMUEL T. THORPE.